United States Patent
McCaskill (10) Patent No.: US 10,655,738 B2
(45) Date of Patent: May 19, 2020

(54) MULTISTAGE STACKED DISC CHOKE

(71) Applicant: National Oilwell Varco, L.P., Houston, TX (US)

(72) Inventor: Lane McCaskill, Houston, TX (US)

(73) Assignee: National Oilwell Varco, L.P., Houston, TX (US)

(\*) Notice: Subject to any disclaimer, the term of this patent is extended or adjusted under 35 U.S.C. 154(b) by 0 days.

(21) Appl. No.: 15/511,056

(22) PCT Filed: Sep. 16, 2014

(86) PCT No.: PCT/US2014/055862
§ 371 (c)(1),
(2) Date: Mar. 14, 2017

(87) PCT Pub. No.: WO2016/043718
PCT Pub. Date: Mar. 24, 2016

(65) Prior Publication Data
US 2017/0276252 A1    Sep. 28, 2017

(51) Int. Cl.
*F16K 47/04* (2006.01)
*F16K 3/24* (2006.01)
(Continued)

(52) U.S. Cl.
CPC .............. *F16K 3/246* (2013.01); *F16K 47/08* (2013.01); *E21B 34/02* (2013.01); *F16K 47/02* (2013.01); *F16K 47/04* (2013.01)

(58) Field of Classification Search
CPC .......... F16K 47/08; F16K 3/246; F16K 47/04; F16K 47/02; E21B 34/02
See application file for complete search history.

(56) References Cited

U.S. PATENT DOCUMENTS

| | | | | |
|---|---|---|---|---|
| 3,780,767 A | * | 12/1973 | Borg | F16K 47/08 |
| | | | | 137/625.3 |
| 3,894,716 A | * | 7/1975 | Barb | F16K 47/02 |
| | | | | 137/625.3 |

(Continued)

FOREIGN PATENT DOCUMENTS

| | | |
|---|---|---|
| EP | 2756949 | 7/2014 |
| JP | 2009-209976 | 9/2009 |

(Continued)

OTHER PUBLICATIONS

European Patent Application No. 14776804.8 Response to Rule 161(1)/162 Communication dated Apr. 25, 2017 filed Oct. 31, 2017 (16 pages).

(Continued)

*Primary Examiner* — Matthew W Jellett
*Assistant Examiner* — Christopher D Ballman
(74) *Attorney, Agent, or Firm* — Conley Rose, P.C.

(57) ABSTRACT

A multistage stacked disk choke includes a housing having a high pressure inlet port and a low pressure outlet port, an assembly, a cage, a seat, and a plug. The assembly includes: a tubular inlet port, a galley intersecting the tubular inlet port, a tubular outlet port, and a bore inward from the tubular outlet port. The cage has an inlet port in communication with the tubular inlet port. The seat is configured to support the assembly. The plug moves inside the assembly bore and restricts flow through the tubular outlet port and/or the tubular inlet port. Operation fluid flows from the high pressure inlet port through the cage inlet port into the tubular inlet port and is redirected into the galley and into the tubular outlet port into the bore of the assembly to a bore in the seat, and out through the low pressure outlet port.

19 Claims, 5 Drawing Sheets

(51) Int. Cl.
*F16K 47/08* (2006.01)
*E21B 34/02* (2006.01)
*F16K 47/02* (2006.01)

(56) References Cited

U.S. PATENT DOCUMENTS

| | | | | | |
|---|---|---|---|---|---|
| 4,279,274 | A | * | 7/1981 | Seger | B23P 15/001 |
| | | | | | 137/625.28 |
| RE31,105 | E | * | 12/1982 | Bates, Jr. | F16K 3/34 |
| | | | | | 137/625.3 |
| 4,398,563 | A | * | 8/1983 | Kay | F16K 3/34 |
| | | | | | 137/625.3 |
| 4,567,915 | A | * | 2/1986 | Bates | F16K 47/08 |
| | | | | | 137/625.3 |
| 4,593,446 | A | * | 6/1986 | Hayner | F16K 47/08 |
| | | | | | 137/625.28 |
| RE32,197 | E | * | 7/1986 | Self | F15D 1/14 |
| | | | | | 137/549 |
| 5,390,896 | A | * | 2/1995 | Smirl | F16K 47/08 |
| | | | | | 137/625.3 |
| 6,047,734 | A | * | 4/2000 | Robinson | F16K 3/246 |
| | | | | | 137/269 |
| 6,782,920 | B2 | * | 8/2004 | Steinke | F16K 47/08 |
| | | | | | 137/625.3 |
| 6,926,032 | B2 | * | 8/2005 | Nawaz | F16K 47/04 |
| | | | | | 137/625.33 |
| 7,089,961 | B2 | * | 8/2006 | Morton | F16K 47/08 |
| | | | | | 137/625.3 |
| 7,690,400 | B2 | * | 4/2010 | Haines | F16K 47/08 |
| | | | | | 137/625.3 |
| 8,881,768 | B2 | * | 11/2014 | Haines | F16K 47/08 |
| | | | | | 137/625.33 |
| 8,910,661 | B2 | * | 12/2014 | Griffin, Jr. | F16K 3/0209 |
| | | | | | 137/625.3 |
| 9,151,407 | B2 | * | 10/2015 | Fontaine | F16K 47/04 |
| 2009/0026395 | A1 | * | 1/2009 | Perrault | F16K 47/08 |
| | | | | | 251/127 |

FOREIGN PATENT DOCUMENTS

| | | |
|---|---|---|
| WO | WO0009923 | 2/2000 |
| WO | WO2013138092 | 9/2013 |

OTHER PUBLICATIONS

European Patent Application No. 14776804.8 Examination Report dated Feb. 7, 2018 (5 pages).
International Preliminary Report on Patentability dated Mar. 21, 2017 for PCT/US2014/055862 (7 pages).
International Search report for PCT/US2014/56862 dated May 20, 2015 (4 Pages).
Written Opinion for PCT/US2014/56862 dated May 20, 2015 (6 pages).
Initial Publication for PCT/US2014/56862 dated Mar. 23, 2016 (32 pages).
English Abstract of JP 2009209976.
European Patent Application No. 14776804.8 Examination Report dated Nov. 13, 2018 (4 pages).
GCC Patent Application No. 2015/30034 Examination Report dated Nov. 29, 2018 (3 pages).
GCC Patent Application No. 2015/30034 Examination Report dated Sep. 14, 2019 (3 pages).
Brazilian Patent Application No. BR112017005230-0 Office Action dated Dec. 11, 2019 (6 pages).

\* cited by examiner

MULTISTAGE STACKED DISC CHOKE

CROSS REFERENCE TO RELATED APPLICATIONS

The present application is a 35 U.S.C. § 371 national phase entry of, and claims priority to, PCT Application No. PCT/US2014/055862, filed Sep. 16, 2014, and entitled "Multistage Stacked Disc Choke" which is hereby incorporated in its entirety by reference herein for all purposes.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Chokes have been used for decades in oilfield operations to reduce the fluid pressure of high pressure flowing fluids. The life of a choke is significantly reduced by cavitation and/or flashing that occurs when high pressure fluids are decompressed. Cavitation occurs when the pressure of a fluid drops below its vapor pressure and then recovers to above its vapor pressure. The desired pressure drop across a choke can cause cavitation, resulting in voids, such as small bubbles, in the fluid. When the pressure recovers to above its vapor pressure near the outlet, the voids can implode and collapse. The repetitive implosions near metal surfaces of the outlet can cause material loss.

Various attempts have been made to reduce cavitation and flashing in chokes. Multiple stages can be used to spread the overall desired pressure drop across the stages to help the pressure remain above its vaporization pressure as the pressure is reduced. Some of the challenges of multistage chokes are the price of the choke, which may be 10-15 times greater than a single stage choke, the short wear life of the choke when solids are present, and clogging of very fine labyrinth passages within a choke.

Multiple concentric cages or multiple stacked disks may be used to define a torturous path through a choke. Stacked disks are disclosed, for example, are made by Weir Power & Industrial in the USA under the brand X-Stream choke. However, the cost of manufacturing multiple disks with varying diameter staggered cylinders extending from the disk face is a significant drawback to these designs.

Therefore, there remains a need for an improved system and method for a multiple stacked disk choke that can be efficiently produced.

SUMMARY OF THE INVENTION

The invention provides an improved multistage stacked disc choke that can be manufactured from a sintering process. The choke includes a plurality of stacked disks that are produced in a "green" sintered state, then stacked, and sintered into a monolithic assembly. The stacked disk monolithic assembly is fitting into a steel cage with porting that aligns with porting on the outside surface of the stacked disks. A seat can be inserted into the steel cage and the assembly inserted into the choke. A plug is then able to be moved axially within the choke to adjust the opening and closing of the porting in the stacked disk assembly. The radial flow paths through the disks are offset from stage to stage, so that the flow impinges on surfaces as the flow progresses through the disks. The porting has a circular cross section to minimize wear and reduce stress risers.

The disclosure provides a multistage stacked disk choke, comprising: a housing having a high pressure inlet port and a low pressure outlet port; a monolithic assembly of at least two sintered disks comprising a circular tubular inlet port in fluid communication with an outer periphery of the monolithic assembly and in fluid communication with the housing inlet port, a circular circumferential galley formed between the outer periphery and an inner periphery of the monolithic assembly and formed to intersect the circular tubular inlet port, and a circular tubular outlet port in fluid communication with the circular circumferential galley, and an internal bore radially inward from the tubular outlet port and in fluid communication with the tubular outlet port; a cage having a bore with a cross section sized to receive the monolithic assembly within the bore, the cage having a cage inlet port in fluid communication with the circular tubular inlet port of the monolithic assembly; a seat in the choke configured to longitudinally support the monolithic assembly, the seat having a seat bore in fluid communication with the low pressure outlet port of the choke; and a plug sized to move longitudinally inside the bore of the monolithic assembly and selectively restrict flow through the tubular outlet port, the tubular inlet port, or a combination thereof, such that in operation fluid flows from the high pressure inlet port through the cage inlet port into the circular tubular inlet port of the monolithic assembly, and is redirected into the circular circumferential galley intersecting the circular tubular inlet port and into the circular tubular outlet port offset from the circular circumferential galley, into the bore of the monolithic assembly to the bore in the seat, and out through the low pressure outlet port.

The disclosure provides a method of flowing fluid through a choke, the choke with a housing having a high pressure inlet port and a low pressure outlet port; a monolithic assembly of at least two sintered disks comprising a circular tubular inlet port in fluid communication with an outer periphery of the monolithic assembly and in fluid communication with the housing inlet port, a circular circumferential galley formed between the outer periphery and an inner periphery of the monolithic assembly and formed to intersect the circular tubular inlet port, and a circular tubular outlet port in fluid communication with the circular circumferential galley, and an internal bore radially inward from the tubular outlet port and in fluid communication with the tubular outlet port; a cage having an internal bore with a cross section sized to receive the monolithic assembly within the bore, the cage having a cage inlet port in fluid communication with the circular tubular inlet port of the monolithic assembly; a seat in the choke configured to longitudinally support the monolithic assembly, the seat having a seat bore longitudinally aligned with the bore of the monolithic assembly and fluid communication with the low pressure outlet port of the choke; a plug sized to move longitudinally inside the bore of the monolithic assembly and selectively restrict flow through the tubular outlet port, the tubular inlet port, or a combination thereof, the method comprising: allowing fluid to flow from the high pressure inlet port through the cage inlet port into the circular tubular inlet port of the monolithic assembly, into the circular circumferential galley intersecting the circular tubular inlet port and into the circular tubular outlet port offset from the circular circumferential galley, into the bore of the monolithic assembly to the bore in the seat, and out through the low pressure outlet port.

These and further features and advantages of the present invention will become apparent from the following detailed description, wherein reference is made to the figures in the accompanying drawings.

DETAILED DESCRIPTION OF PREFERRED EMBODIMENTS

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Where appropriate, one or more elements may have been labeled with an "A" or "8" to designate various members of a given class of an element. When referring generally to such elements, the number without the letter can be used. Further, such designations do not limit the number of members that can be used for that function.

The disclosure provides an improved multistage stacked disc choke that can be manufactured from a sintering process. The choke includes a plurality of stacked disks that are produced in a "green" sintered state, then stacked, and sintered into a monolithic assembly. The stacked disk monolithic assembly is fitting into a steel cage with porting that aligns with porting on the outside surface of the stacked disks. A seat can be inserted into the steel cage and the assembly inserted into the choke. A plug is then able to be moved axially within the choke to adjust the opening and closing of the porting in the stacked disk assembly. The radial flow paths through the disks are offset from stage to stage, so that the flow impinges on surfaces as the flow progresses through the disks. The porting has a circular cross section to minimize wear and reduce stress risers.

Figure 1:
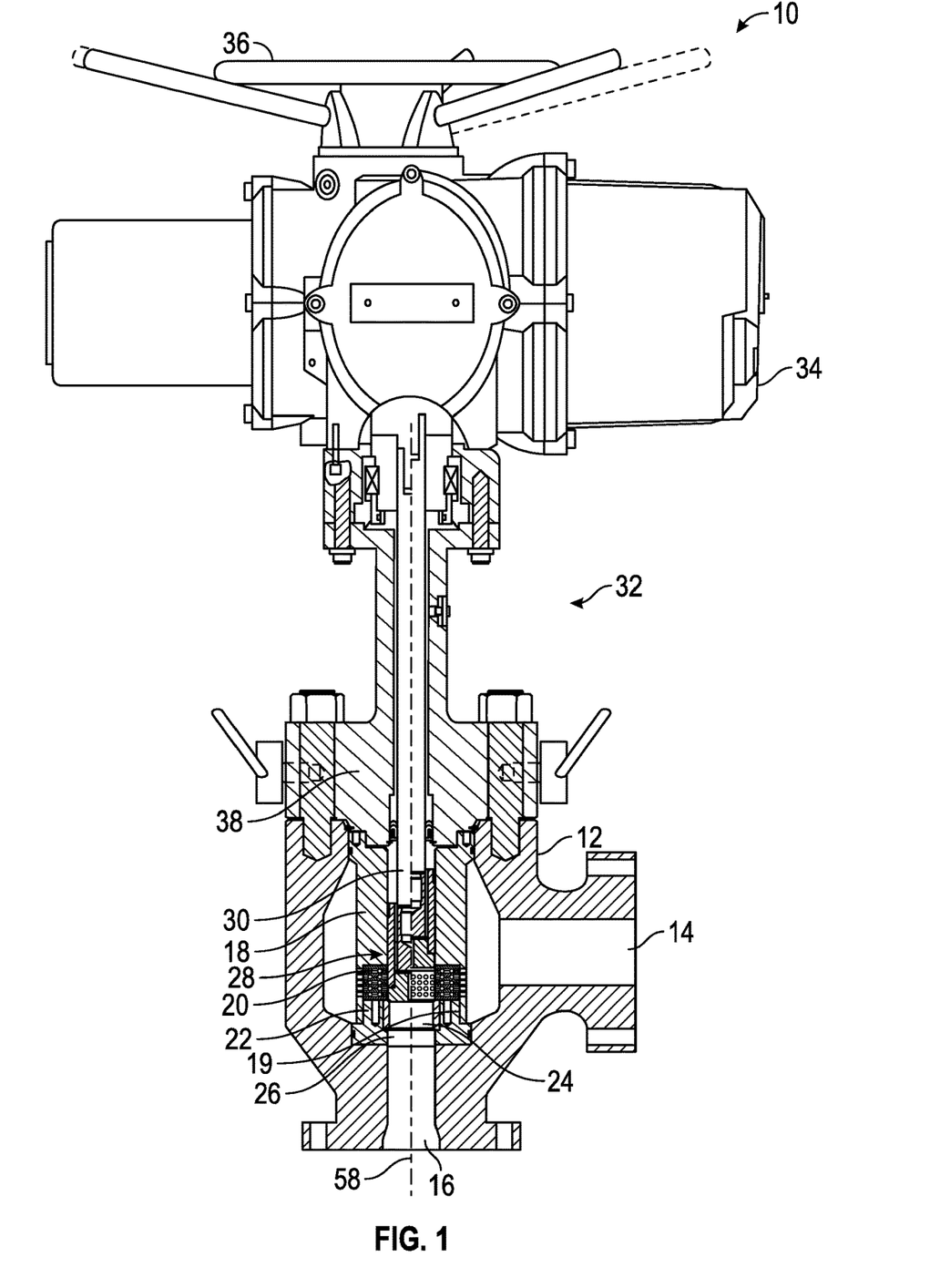
FIG. 1 is a partial cross-sectional schematic view of one embodiment of a multistage stacked disk choke having a monolithic assembly.
Figure 2:
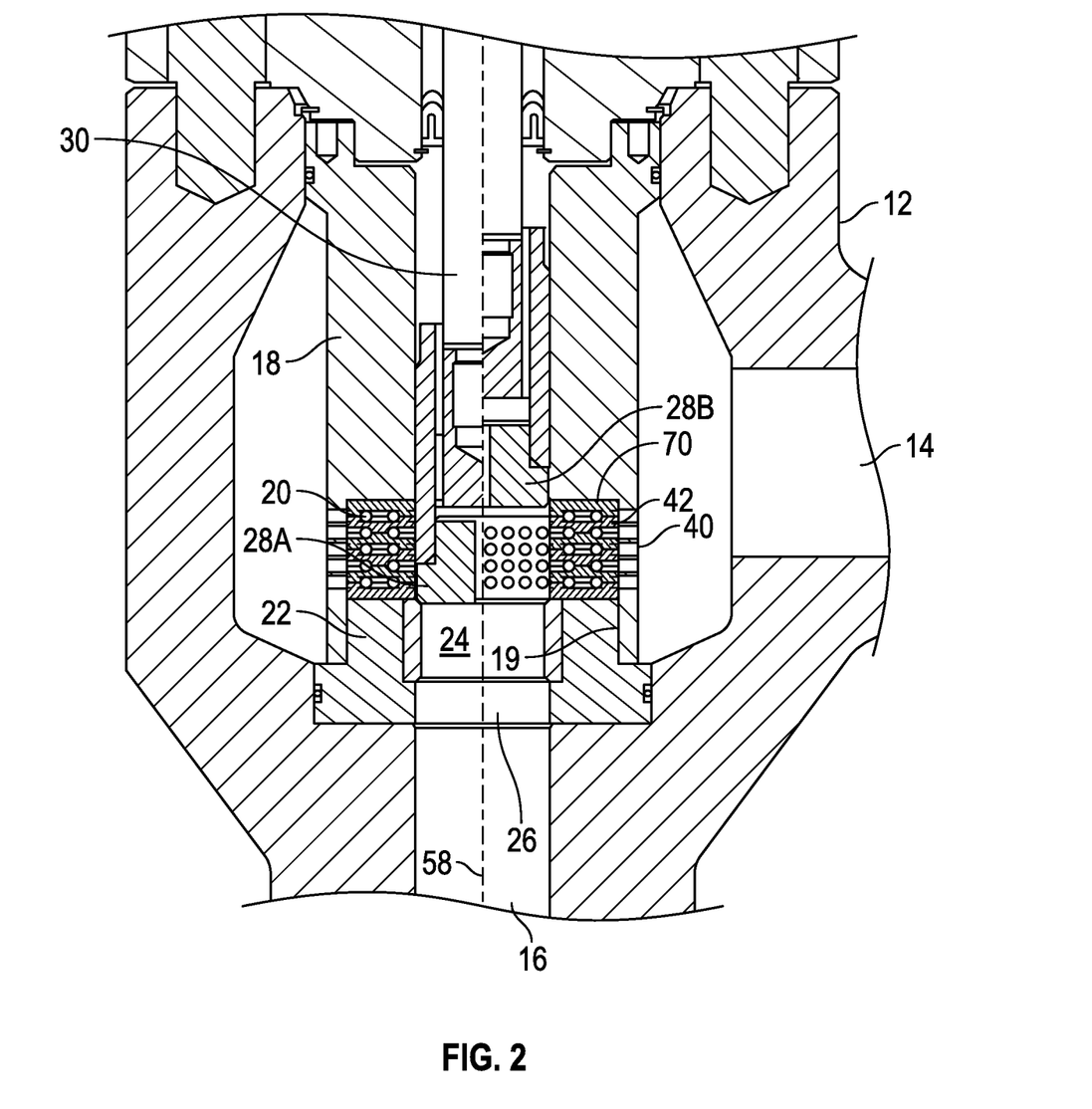
FIG. 2 is a schematic view of an enlarged portion of the exemplary choke of FIG. 1.

FIG. 1 is a partial cross-sectional schematic view of one embodiment of a choke. FIG. 2 is a schematic view of an enlarged portion of the exemplary choke of FIG. 1. The figures will be described in conjunction with each other. A choke 10 includes a housing 12 having a high pressure inlet port 14 and a low pressure outlet port 16. A cap 38 can be coupled to the housing 12 and an actuator 32 coupled to the cap. The actuator 32 can be manual or powered, and can be remotely controlled. As an exemplary actuator, a handle 36 is shown to turn elements in a gear assembly 34 to longitudinally raise and lower the plug 28.

A cage 18 is positioned within the housing 12 and has an internal bore 19. A monolithic assembly 20 can be formed of pressure reducing disks and mounted in the cage 18 at least partially within the bore 19. A choke seat 20 may be coupled to the housing 12 to receive the cage 18 and/or the monolithic assembly 20. The cage 18 may be shrunk fit or otherwise secured to the choke seat 22. The monolithic assembly 20 is formed with an internal bore 24 fluidicly coupled with the low pressure outlet port 16. A plug 28 can longitudinally move by motion of the actuator 32 along the centerline 58 within the bore 24 to control the flow through the monolithic assembly by at least partially blocking portions therein. In FIG. 1, the plug 28 is shown on the left side of the centerline 58 partially blocking the flow through the monolithic assembly in a partially open position on the choke, and the plug is shown on the right side of the centerline 58 in a raised position that is not at least partially blocking flow through the monolithic assembly so that the choke is in a fully open position. In FIG. 2, plug 28 is designated as 28A on the left side of centerline 58 and as 28B on the right side of centerline 58.

The monolithic assembly 20 generally includes a stack of disks with internal ports formed therein by the combined assembly of the disks. In at least one embodiment, the longitudinal middle portion of the monolithic assembly include one or more disks 42 that have partial passageways formed on both faces of the disks that when coupled together form the whole passageways. The top and bottom of the monolithic assembly include one or more end disks having partial passageways formed on one face to be coupled with the face of an adjacent disk 42 to form the whole passageways, while the other face of the end disks may have no partial passageways formed thereon. Further details are described herein.

In operation, generally fluid would enter through the side of the housing 12 through the inlet port 14 and flow into an annulus in the housing around the cage 18 and through the cage inlet ports 40. The fluid can enter the monolithic assembly 20 and flow therethrough for a pressure reduction, and then into the bore 24 of the monolithic assembly, subject to restricted flow from the plug 28 positioned in the bore. The fluid can exit through the outlet port 16 at a reduced pressure.

Figure 3:
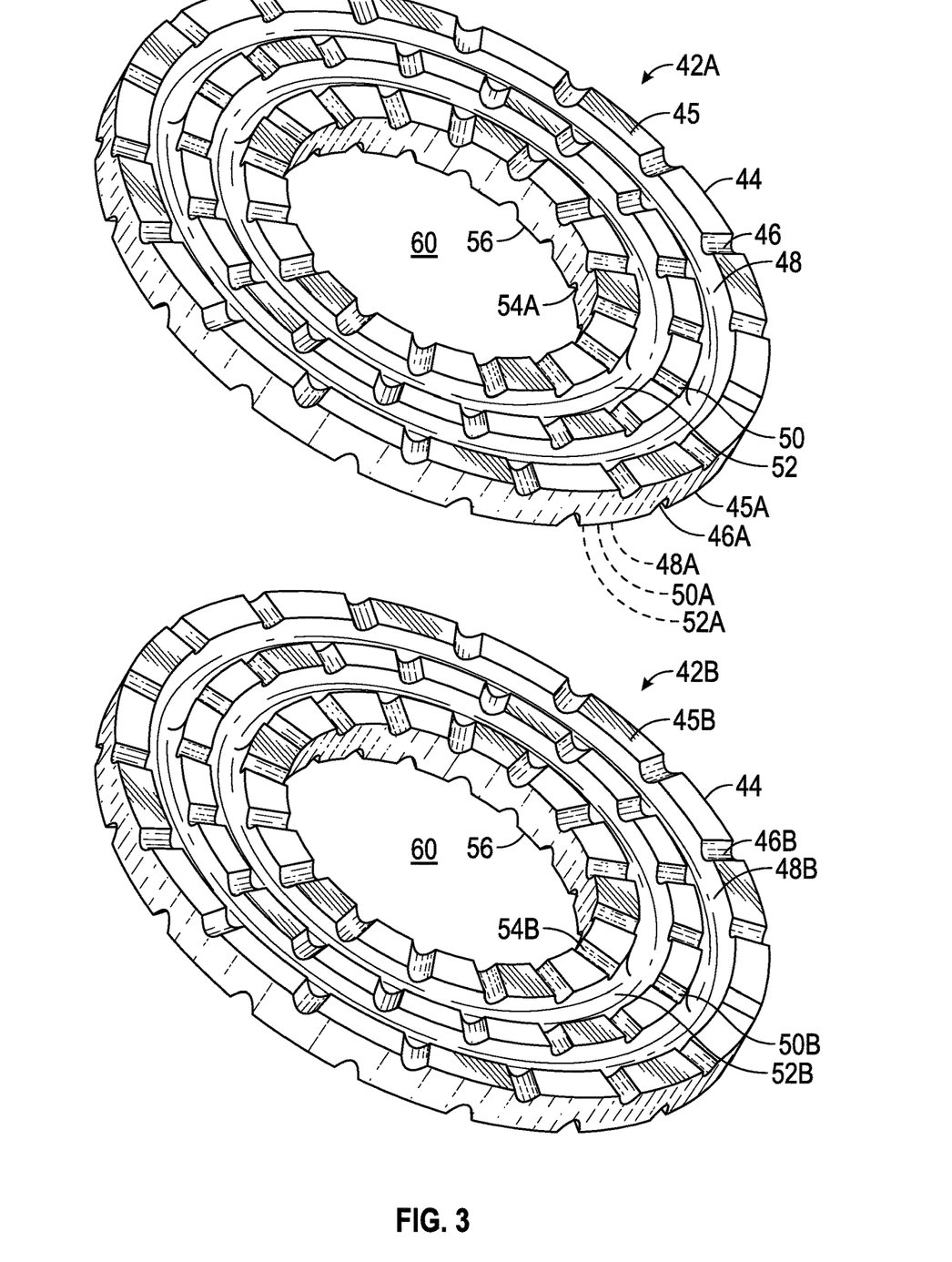
FIG. 3 is a perspective schematic view of a plurality of disks to form the monolithic assembly of stacked disks for the choke.

FIG. 3 is a perspective schematic view of a plurality of disks to form the monolithic assembly of stacked disks for the choke. A disk 42 has several semicircular flow passageways for forming the different flow passages therein. In the exemplary embodiment, three stages are shown. However, it is understood that any number of stages (lesser or greater) can be used and the exemplary embodiment is for illustrative purposes.

Starting from the outer periphery 44 of the disks that collectively form the monolithic assembly, a plurality of semi-circular tubular inlet ports 46 are formed radially around the outer periphery 44 as a first stage in the disk 42A and ultimately the monolithic assembly 20. The inlet ports 46 intersect a semi-circular first circumferential galley 48. The galley 48 provides a pathway for flow from the inlet ports 46 to be distributed in a circumferential manner.

On a distal side of the galley 48 from the inlet ports, a plurality of semicircular access ports 50 are formed radially around the galley 48 as a second stage of flow in the disk. The semi-circular access ports 50 are generally offset from a radial alignment with the inlet ports 46. The offset provides an obstruction of the galley wall to the incoming flow from the inlet ports to cause turbulence and pressure reduction as the fluid impinges on the galley wall from the inlet ports and must turn several angles by first turning into the galley, and then turning into the radially offset access port 50. In at least one embodiment, one or more ports on one side of the galley can be offset about halfway between one or more ports on the other side of the galley. Further, the cross-sectional size of the ports in the different stages can vary as may be determined from flow considerations.

The disk face 45 can further be formed with a semi-circular second circumferential galley 52, so that the semi-circular access port 50 intersects the semicircular second circumferential galley 52 to distribute flow from the access port into the second galley.

A semi-circular tubular outlet port 54 is formed to intersect the semicircular second circumferential galley 52 as a third stage. Likewise, the semi-circular tubular outlet ports 54 can be formed around the disk face 45 in an alignment that is radially offset from the access ports 50. The offset alignment similarly allows fluid flowing through the access port 50 to encounter resistance as the fluid impinges the wall of the galley 52 and must turn at angles in the galley to exit through the outlet ports 54, thus causing turbulence, further flow resistance, and pressure reduction. The disk 42A includes an inner periphery 56 that forms a bore 60 of the disks 42, where the bore is generally aligned with a centerline 58. The cumulative bores 60 of multiple disks 42 can form the bore 24 of the monolithic assembly described above.

Disk 42B can generally be formed in the same manner as disk 42A. For example, the underside face 45A of the disk 42A can be formed similarly as the upper face 45B of the disk 42B, so that a semi-circular tubular inlet port 46A on disk 42A has a mating semi-circular tubular inlet port 46B on disk 42B, and likewise a semi-circular first circumferential galley 48A has a mating semi-circular first circumferential galley 48B, a semi-circular access port 50A has a mating semi-circular access port 50B, a semi-circular second circumferential galley 52A has a mating semi-circular second circumferential galley 52B, and a semi-circular tubular outlet port 54A has a mating semi-circular tubular outlet port 54B. When the disks are mounted together and properly aligned face to face, the semi-circular portions of the disk 42A coupled to the semi-circular portions of the disk 42B complete the cross-sectional circular shapes to form the circular ports and flow passages described herein. Other disks could be used and are contemplated, so that for example, the underside face of disk 42B could be formed in a similar manner as the top face of disk 42A and further stacked on top or under other disks to form additional flow passages as described herein. The circular shapes assist in reducing erosion that would otherwise be encompassed by sharp angles and corners. The term "circular" is used broadly herein and includes generally round, oval, and elliptical shapes, and other shapes that are absent 90-degree corners of a cross-section of a square or rectangle.

Figure 4:
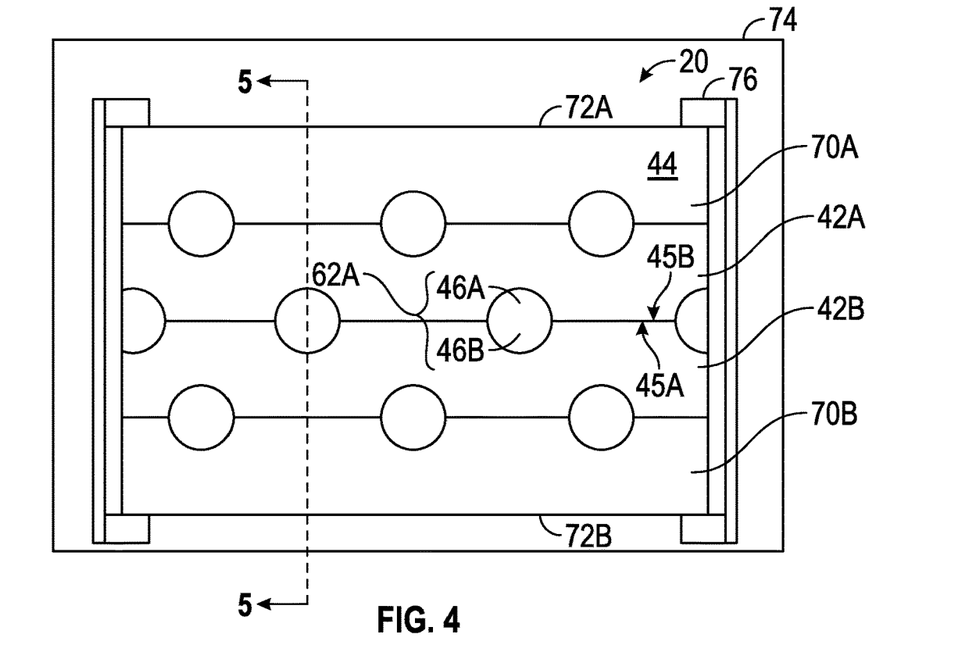
FIG. 4 is a side view schematic of an exemplary monolithic assembly of stacked disks assembled for sintering in an oven.

FIG. 4 is a side view schematic of an exemplary monolithic assembly of stacked disks assembled for sintering in an oven. The disks are generally formed from tungsten carbide or other abrasive resistant (but generally brittle) material, such as hardened stainless or nickel-based metals. Due to difficulties in machining such materials, it is envisioned that the individual disks 42 be formed as molded shapes through powder metallurgy or other fabrication processes. However, the disks 42 are prepared to a "green" state, such that they can retain their shapes for temporary handling, but require further processing for completion. When the disks are formed in a green state so that they can be handled, the disks can be assembled together, for example, in the manner shown in FIG. 4. To retain the stack of green disks in a proper alignment and shape, the disks can be held in position with an exemplary fixture 76. The assembly of the several disks and fixture 76 can be placed in a sintering oven 74, using for example a sintering hot isostatic pressing operation, for completion of the process to sinter the green disks together into the monolithic assembly 20. Thus, when the disks are assembled, the face of one disk with its semicircular portions of the flow passageways mates with a corresponding face of an adjacent disk and its semi-circular portions to form the full circular passageways shown therein. For example, a semi-circular tubular inlet port 46A of disk 42A can be aligned with a semi-circular tubular inlet port 46B of the disk 42B, so that the semicircular tubular inlet ports 46A, 46B form in combination a circular tubular inlet port 62A.

In some embodiments, the monolithic assembly will include one or more end disks 70. The end disks 70 are similar to the disks 42 with the primary difference being that the end disks have only one face formed with the semi-circular flow passageways. The other face is generally absent such flow passageways, because no choking function through the valve is contemplated across the end faces 72A and 72B of the end disks 70A and 70B, respectively.

Figure 5:
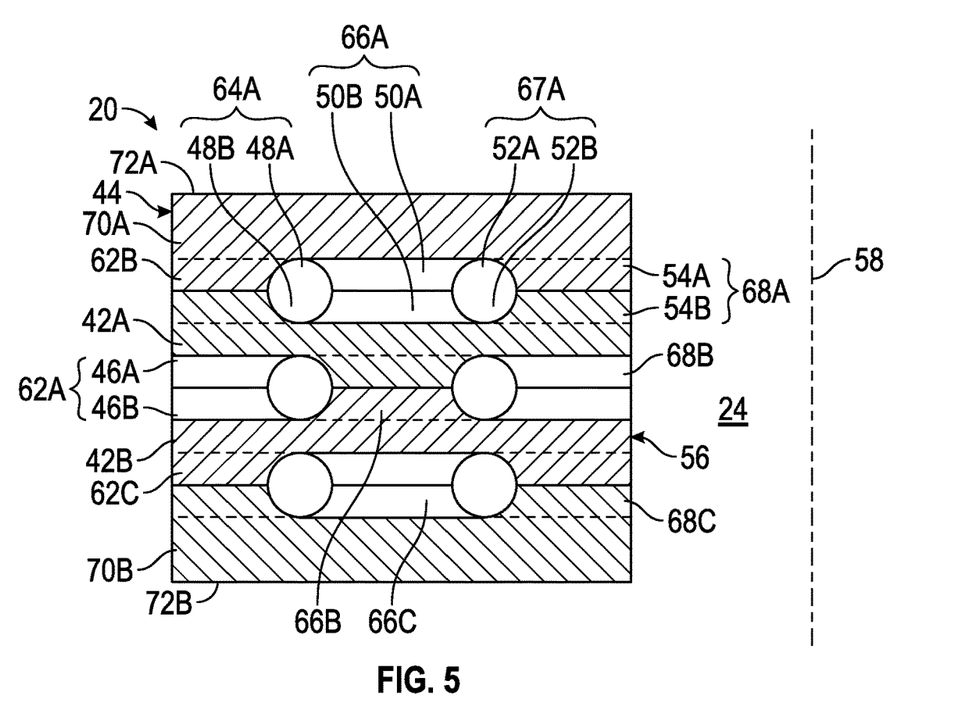
FIG. 5 is a partial cross-sectional schematic view of a monolithic assembly.

FIG. 5 is a partial cross-sectional schematic view of a monolithic assembly, more specifically, a partial cross section of the monolithic assembly 20 to the left side of the centerline 58 of bore 24. The monolithic assembly 20 has been sintered from the assembly of green disks 42, and thus the lines shown in FIG. 5 and the demarcations of each of the disks described in FIG. 5, are for illustrative purposes and may not in fact exist as separate units or discreet surfaces between the disks after the sintering process in the produced article.

Starting from the left of the sheet with the outer periphery 44 of disks of the monolithic assembly, the top end disk 70A is coupled to the disk 42A with flow passageways aligned to allow flow therethrough. The end disk 70A can have an end face 72A which generally will not have partial flow passages formed thereon, because no flow is expected to be controlled over the end face. In this particular cross-section, the tubular inlet port 62B at the interfaces between the end disk 70A and disk 42A is shown existing in a different plane from the particular cross-section chosen. The circular tubular inlet port 62B intersects the circular tubular first galley 64A formed by the mating coupling of the semi-circular first circumferential galleys 48A and 48B. In the plane of the particular cross-section chosen for FIG. 5, the semi-circular access ports 50A and 50B are shown in solid lines and form the circular tubular access port 66A. In the exemplary embodiment with optional other stages, a circular tubular second galley 67 is formed from the semi-circular second circumferential galleys 52A and 52B. A circular tubular outlet port 68A is formed radially inward from the second galley 67 A by the mating coupling of semi-circular tubular outlet ports 54A and 54B. Thus, the circular tubular inlet port 62B and the circular tubular outlet port 68A are generally not aligned radially with the circular tubular access port 66A. Further, the circular tubular inlet port 62B may also not be radially aligned with the circular tubular outlet port 68A.

In a similar fashion, the faces of the disks 42A and 42B can be coupled together in the sintering process to form flow passageways therebetween. In the particular cross-section shown, the circular tubular inlet port 62A is formed from the two semi-circular tubular inlet ports 46A and 46B. In the embodiment shown, the circular tubular inlet port 62A may not be radially aligned with the inlet port 62B. Also, the access port 66B on the distal side of the circular tubular first galley 64 will generally not be radially aligned with the inlet port 62A. The outlet port 68B on the other side of the circular tubular second galley 67 will generally not be aligned with the access port 66B, and mayor may not be aligned with the inlet port 62A.

An end disk 70B may be coupled with the disk 42B to form the flow passages therethrough similarly as described above relative to the end disk 70A and disk 42A. The inlet port 62C is generally not aligned with the access port 66C and the access port 66C is generally not aligned with the outlet port 68C. In the embodiment shown, the access port 66A can be radially aligned with the access port 66C. The end disk 70B has an end face 72B that may not have access ports formed thereon, because no flow is expected to be directed across the end face 72B for control and pressure reduction.

Thus, the monolithic assembly 20 can form flow passageways from the outer periphery 44 to the inner periphery 56 of the monolithic assembly with radially offset passageways for pressure reduction across multiple stages, but in a manner that is cost effective by preforming certain portions of the assembly and then sintering the portions into a final monolithic assembly.

Figure 6:
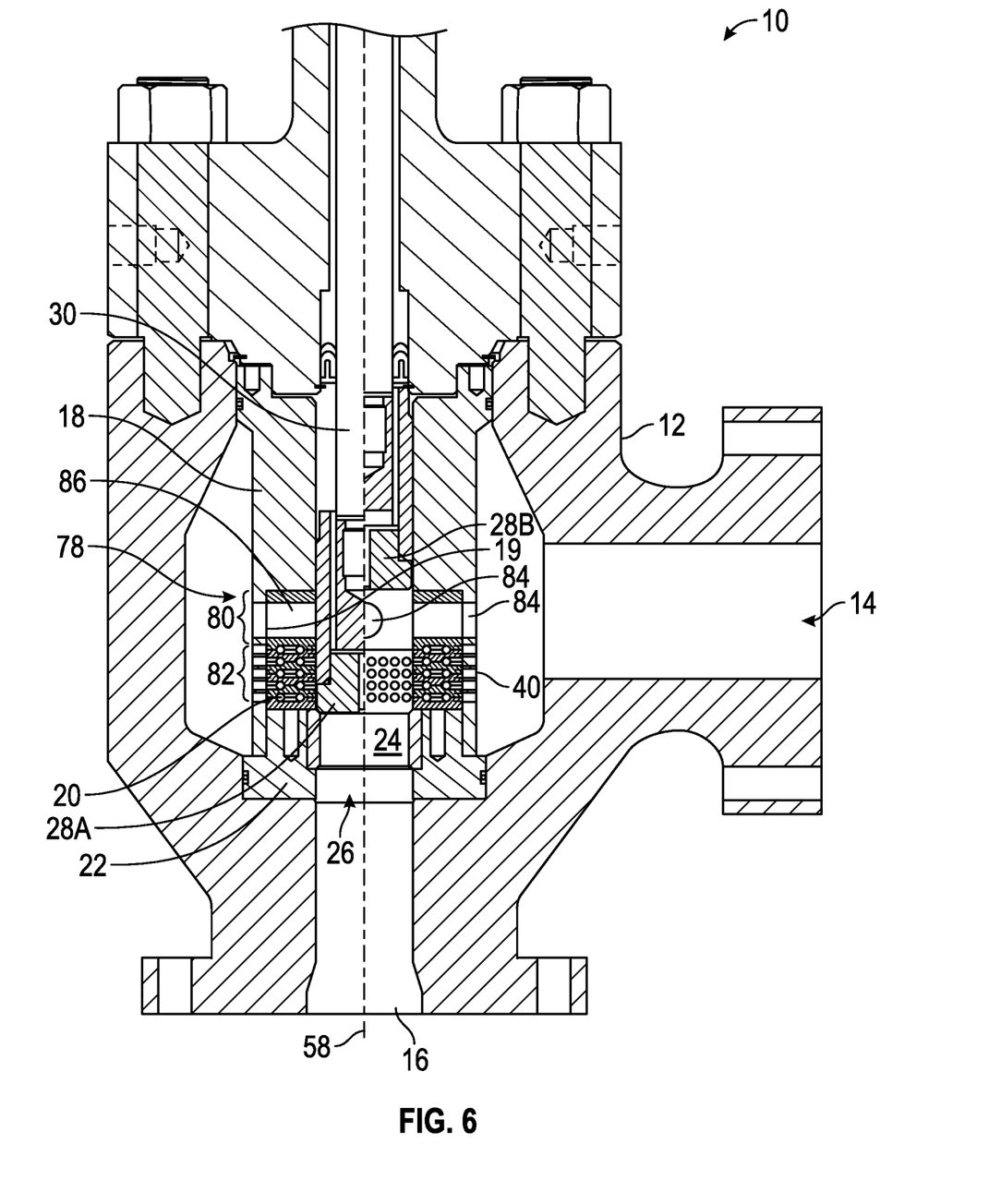
FIG. 6 is an alternative embodiment of a multistage stacked disk choke having a combination of zones.

FIG. 6 is an alternative embodiment of a multistage stacked disk choke having a combination of zones. The choke 10 is similar to the choke described above, but includes a zoned monolithic assembly 78 and related flow passages through the cage. There are flow regimes when a high flow does not need multistages for a choke, such as to avoid cavitation, but other flow regimes through the same choke can use multistages for the choke. A combination choke having different flow zones for the stages can be used to satisfy the multiple flow regimes.

In the exemplary choke 10, the housing 12 includes a high pressure inlet port 14 and a low pressure outlet port 16. A cage 18 is disposed in the choke housing and has a bore 19 to receive the zoned monolithic assembly 78 having a bore 24. A seat 22 is positioned below the assembly 78 and has a bore 26 in fluid communication with the bore 24. A plug 28 is coupled to a stem 30 and selectively moveable along a longitudinal centerline 58 within the bore 24 of the zoned monolithic assembly 78. The cage 18 has at least one cage inlet port 84 for a first zone of the zoned monolithic assembly 78 and at least one cage inlet port 40 for a second zone of the zoned monolithic assembly 78.

The zoned monolithic assembly 78 includes a first zone 80 having an assembly inlet port 86 in fluid communication with the cage inlet port 84 on an upstream side and the bore 24 on a downstream side. The first zone 80 can have larger, more open flow passageways than the second zone to allow higher flows with less flow resistance in the choke in a first flow regime. For illustrative purposes and without limitation, the embodiment shown in FIG. 6 is representative of a single stage for the first zone 80 in the zoned monolithic assembly 78.

The zoned monolithic assembly 78 also includes a second zone 82 having the inlet ports and other ports in the monolithic assembly that are described in more detail in reference to FIGS. 3, 4, and 5. The inlet ports of the second zone 82 are in fluid communication with the cage inlet port 40 on an upstream side and the bore 24 on a downstream side. The second zone 82 can have smaller, more restrictive and circuitous flow passageways than the first zone 80 to cause more pressure drop at lower flows through the choke in a second flow regime. For illustrative purposes and without limitation, the embodiment shown in FIG. 6 is representative of a multistage assembly having three stages in the zoned monolithic assembly 78.

Optionally, the zoned monolithic assembly 78 can be split into separate assemblies of the first zone 80 and the second zone 82 and are included herein as a "monolithic assembly."

In operation, when a high flow rate occurs, the stem 30 can move the plug 28 longitudinally upward in the bore 24 to allow higher flows through the cage inlet port 84 and first zone 80 of the monolithic assembly, and generally through the second zone as well. As more pressure drop in the flow is desired, the plug can be extended into the bore 24 to at least partially restrict the flow through the first zone and force a higher percentage of the flow through the second zone causing a greater pressure drop. The plug 38 can be further extended to restrict entirely flow through the first zone and at least partially or fully restrict flow through the second zone.

The monolithic assembly can be made without requiring stacked disks by using recent technological advances in additive manufacturing also known as three-dimensional printing. Under such technology, additive manufacturing or 3D printing refers to any of various processes for making a three-dimensional object primarily through additive processes in which successive layers of material are laid down under computer control. Such processes can use metal sintering forms of additive manufacturing, including without limitation, selective laser sintering and direct metal laser sintering. Thus, the lines in FIG. 4 representing the prior stacked disks would not be present in such an embodiment.

Other and further embodiments utilizing one or more aspects of the invention described above can be devised without departing from the spirit of Applicant's invention. For example and without limitation, it is possible to have any number of stages, any number of zones for different flow regimes, to have an assembly without end disks with the understanding that any semi-circular flow passages existing on the top and bottom faces of the monolithic assembly may not be used for flow reduction, to not have multiple sets of access ports for various stages between the inlet and outlet ports, or to have no access ports so that the inlet ports and outlet ports are separated by a galley directly.

Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalent of the following claims.

What is claimed is:

1. A multistage stacked disk choke, comprising:
   a housing having a high pressure inlet port and a low pressure outlet port;
   a monolithic assembly of at least two sintered disks comprising a circular tubular inlet port formed partially as two semicircular tubular inlet ports in a face of a first disk of the at least two sintered disks and a face of a second disk of the at least two sintered disks, the circular tubular inlet port in fluid communication with an outer periphery of the monolithic assembly and in fluid communication with the housing inlet port, a circular circumferential galley formed between the outer periphery and an inner periphery of the monolithic assembly and formed to intersect the circular tubular inlet port, and a circular tubular outlet port in fluid communication with the circular circumferential galley, and an internal bore radially inward from the tubular outlet port and in fluid communication with the tubular outlet port, wherein the circular circumferential galley extends circumferentially around the entire bore;
   a cage having a bore with a cross section sized to receive the monolithic assembly within the bore, the cage having a cage inlet port in fluid communication with the circular tubular inlet port of the monolithic assembly;
   a seat in the choke configured to longitudinally support the monolithic assembly, the seat having a seat bore in fluid communication with the low pressure outlet port of the choke; and
   a plug sized to move longitudinally inside the bore of the monolithic assembly and selectively restrict flow through the tubular outlet port, the tubular inlet port, or a combination thereof,
   such that in operation fluid flows from the high pressure inlet port through the cage inlet port into the circular tubular inlet port of the monolithic assembly, and is redirected into the circular circumferential galley intersecting the circular tubular inlet port and into the circular tubular outlet port offset from the circular circumferential galley, into the bore of the monolithic assembly to the bore in the seat, and out through the low pressure outlet port.

2. The choke of claim 1, further comprising a plurality of circular tubular inlet ports circumferentially disposed around an outer periphery of the monolithic assembly and a plurality of cage inlet ports in fluid communication with the plurality of circular tubular inlet ports.

3. The choke of claim 2, further comprising a plurality of circular tubular inlet ports longitudinally disposed along the monolithic assembly.

4. The choke of claim 1, further comprising a plurality of circular tubular outlet ports circumferentially disposed around an inner periphery of the monolithic assembly.

5. The choke of claim 4, wherein longitudinal movement of the plug selectively restricts flow in one or more of the longitudinally disposed circular tubular outlet ports.

6. The choke of claim 1, further comprising a stem coupled to the plug, and an actuator coupled to the stem to move the stem and plug longitudinally within the bore of the monolithic assembly.

7. The choke of claim 1, wherein a top surface and a bottom surface of the monolithic assembly has no inlet port, circumferential galley, or outlet port.

8. The choke of claim 1, wherein at least one of the sintered disks comprises tungsten carbide, hardened stainless, nickel-based metals, or a combination thereof.

9. The choke of claim 1, wherein the circular tubular inlet port, the circumferential galley, and the circular tubular outlet port comprises a two-stage choke.

10. The choke of claim 1, wherein the tubular outlet port is circumferentially offset from the tubular inlet port.

11. The choke of claim 1, wherein the circular circumferential galley is a first circular circumferential galley, and further comprising a second circular circumferential galley formed between the first circular circumferential galley and the circular tubular outlet port of the monolithic assembly, the first circular circumferential galley being in fluid communication with the second circular circumferential galley through a circular tubular access port therebetween, and wherein the circular tubular inlet port is in fluid communication with the first circular circumferential galley, the circular tubular outlet port is in fluid communication with the second circular circumferential galley, and the circular tubular access port is circumferentially offset from the circular tubular inlet port and the circular tubular outlet port forming a three-stage choke.

12. The choke of claim 1, further comprising one or more circular circumferential galleys formed within the monolithic assembly with a plurality of access ports in fluid communication with the circular circumferential galleys, such that in operation fluid flows from the high pressure inlet port through the cage inlet port into the circular tubular inlet port of the monolithic assembly, through the circular circumferential galleys and the access ports, through the circular tubular outlet port, into the bore of the monolithic assembly to the bore in the seat, and out through the low pressure outlet port to form the choke with multiple stages.

13. The choke of claim 1, wherein the monolithic assembly comprises a first zone having a first set of one or more flow passageways and a second zone having a second set of one or more flow passageways different than the first set, the first one being longitudinally offset from the second zone.

14. A method of flowing fluid through a choke, the choke having a housing with a high pressure inlet port and a low pressure outlet port; a monolithic assembly of at least two sintered disks comprising a circular tubular inlet port formed partially as two circumferentially aligned semicircular tubular inlet ports in a face of a first disk of the at least two sintered disks and a face of a second disk of the at least two sintered disks, the circular tubular inlet port in fluid communication with an outer periphery of the monolithic assembly and in fluid communication with the housing inlet port, a circular circumferential galley formed between the outer periphery and an inner periphery of the monolithic assembly and formed to intersect the circular tubular inlet port, and a circular tubular outlet port in fluid communication with the circular circumferential galley, and an internal bore radially inward from the tubular outlet port and in fluid communication with the tubular outlet port, wherein the circular circumferential galley extends circumferentially around the entire bore; a cage having an internal bore with a cross section sized to receive the monolithic assembly within the bore, the cage having a cage inlet port in fluid communication with the circular tubular inlet port of the monolithic assembly; a seat in the choke configured to longitudinally support the monolithic assembly, the seat having a seat bore longitudinally aligned with the bore of the monolithic assembly and in fluid communication with the low pressure outlet port of the choke; a plug sized to move longitudinally inside the bore of the monolithic assembly and selectively restrict flow through the tubular outlet port, the tubular inlet port, or a combination thereof, the method comprising:
    allowing fluid to flow from the high pressure inlet port through the cage inlet port into the circular tubular inlet port of the monolithic assembly, into the circular circumferential galley intersecting the circular tubular inlet port and into the circular tubular outlet port offset from the circular circumferential galley, into the bore of the monolithic assembly to the bore in the seat, and out through the low pressure outlet port.

15. A multistage stacked disk choke, comprising:
a housing having a high pressure inlet port and a low pressure outlet port;
a monolithic assembly of at least two sintered disks comprising a circular tubular inlet port in fluid communication with an outer periphery of the monolithic assembly and in fluid communication with the housing inlet port, a circular circumferential galley formed between the outer periphery and an inner periphery of the monolithic assembly and formed to intersect the circular tubular inlet port, and a circular tubular outlet port in fluid communication with the circular circumferential galley, and an internal bore radially inward from the tubular outlet port and in fluid communication with the tubular outlet port, wherein the circular circumferential galley extends circumferentially around the entire bore;
a cage having a bore with a cross section sized to receive the monolithic assembly within the bore, the cage having a cage inlet port in fluid communication with the inlet port of the monolithic assembly;
a seat in the choke configured to longitudinally support the monolithic assembly, the seat having a seat bore in fluid communication with the low pressure outlet port of the choke; and
a plug sized to move longitudinally inside the bore of the monolithic assembly and selectively restrict flow through the circular tubular outlet port, the circular tubular inlet port, or a combination thereof,
such that in operation fluid flows from the high pressure inlet port through the cage inlet port into the circular tubular inlet ports of the monolithic assembly, and is redirected into the circular circumferential galley intersecting the circular tubular inlet ports and into the circular tubular outlet port offset from the circular circumferential galley, into the bore of the monolithic assembly to the bore in the seat, and out through the low pressure outlet port;
wherein at least one of the two sintered disks comprises a plurality of circumferentially spaced semicircular inlet ports and a plurality of semicircular access ports, and wherein the circumferential galley is positioned between the plurality of semicircular inlet ports and the plurality of semicircular access ports and each of the plurality of semicircular access ports is circumferentially spaced from each of the plurality of semicircular inlet ports.

16. The choke of claim 15, further comprising a plurality of circular tubular outlet ports circumferentially disposed around an inner periphery of the monolithic assembly.

17. The choke of claim 16, wherein longitudinal movement of the plug selectively restricts flow in one or more of the longitudinally disposed circular tubular outlet ports.

18. The choke of claim 15, further comprising a stem coupled to the plug, and an actuator coupled to the stem to move the stem and plug longitudinally within the bore of the monolithic assembly.

19. The choke of claim 15, wherein the circular tubular inlet port of the monolithic assembly is formed partially as two semicircular tubular inlet ports in a face of a first disk of the at least two sintered disks and a face of a second disk of the at least two sintered disks.

* * * * *